United States Patent
Gandhewar et al.

(10) Patent No.: US 10,050,937 B1
(45) Date of Patent: Aug. 14, 2018

(54) REDUCING IMPACT OF NETWORK ATTACKS IN ACCESS NETWORKS

(71) Applicant: Juniper Networks, Inc., Sunnyvale, CA (US)

(72) Inventors: Sunil Madhaorao Gandhewar, Bangalore (IN); Arun S. G., Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/394,040

(22) Filed: Dec. 29, 2016

(51) Int. Cl.
*H04L 29/06* (2006.01)

(52) U.S. Cl.
CPC ...... *H04L 63/0254* (2013.01); *H04L 63/1458* (2013.01); *H04L 69/22* (2013.01)

(58) Field of Classification Search
CPC .. H04L 63/0254; H04L 63/1458; H04L 69/22
See application file for complete search history.

(56) References Cited

U.S. PATENT DOCUMENTS

| | | | |
|---|---|---|---|
| 6,658,565 B1 * | 12/2003 | Gupta | ...................... H04L 29/06 713/153 |
| 6,976,154 B1 | 12/2005 | Dyckerhoff | |
| 7,184,437 B1 | 2/2007 | Cole | |
| 7,546,635 B1 * | 6/2009 | Krohn | ................. H04L 63/0254 370/351 |
| 7,990,993 B1 | 8/2011 | Ghosh | |
| 8,347,075 B1 * | 1/2013 | Zhang | ................. H04L 63/1441 380/256 |
| 8,484,372 B1 * | 7/2013 | Callon | ..................... H04L 47/10 370/229 |
| 8,514,845 B2 | 8/2013 | Sargor et al. | |
| 8,837,479 B1 | 9/2014 | Kumar | |
| 8,966,270 B2 | 2/2015 | Bu et al. | |
| 2009/0141717 A1 * | 6/2009 | Cabeca | ............... H04L 12/4645 370/389 |
| 2009/0158388 A1 * | 6/2009 | Sridhar | ............... H04L 41/0604 726/2 |

(Continued)

OTHER PUBLICATIONS

Droms, "Dynamic Host Configuration Protocol," Network Working Group, RFC 2131, Mar. 1997, 45 pp.

(Continued)

*Primary Examiner* — Meng Li
(74) *Attorney, Agent, or Firm* — Shumaker & Sieffert, P.A.

(57) ABSTRACT

In general, techniques are described for reducing impact of network attacks in access networks. A network device including an interface in a forwarding plane of the network device, and a policer configured in a packet forwarding engine of the forwarding plane may be configured to perform the techniques. The interface may receive a packet from a subscriber access device positioned at an edge of sub-network of an access network. The packet may include trusted information inserted by an intermediate network device positioned between the network device and the subscriber access device. The policer may determine, based on the trusted information, whether the packet is associated with the network attack. Based on the determination of whether the packet is associated with the network attack, the policer may forward the packet for subsequent protocol-specific processing.

20 Claims, 6 Drawing Sheets

(56) References Cited

U.S. PATENT DOCUMENTS

| | | | | |
|---|---|---|---|---|
| 2013/0055373 | A1* | 2/2013 | Beacham | H04L 47/12 726/13 |
| 2014/0330982 | A1* | 11/2014 | Jalan | H04L 63/0892 709/229 |

OTHER PUBLICATIONS

"Distributed Denial-of-Service Protection Feature Guide," Juniper Networks Inc., retrieved on Oct. 5, 2016, from https://www.juniper.net/documentation/en_US/junos13.3/information-products/pathway-pages/config-guide-ddos/ddos-protection.html#configuration, 1 pp.

"Example: Configuring DDoS Protection," Juniper Networks Inc., Oct. 16, 2014, from https://www.juniper.net/documentation/en_US/junos14.2/topics/example/subscriber-management-ddos-example.html, 11 pp.

"Chapter 10: Configuring DDoS Prevention," Cisco, retrieved Oct. 5, 2016, from http://www.cisco.com/c/en/us/td/docs/app_ntwk_services/data_center_app_services/gss4400series/v2-0/configuration/cli/gslb/guide/cli_gslb/DDoS.pdf, 14 pp.

"What is a DDoS Attack and how do you Protect Against DDoS Attacks?," Arbor Networks, retrieved on Oct. 5, 2016, from https://www.arbornetworks.com/research/ddos-resources, 3 pp.

"Triple Play Security," Alcatel-Lucent, retrieved on Oct. 5, 2016, from http://infodoc.alcatel-lucent.com/html/0_add-h-f/93/0098-09-01/7750_ SR_ OS_Triple_Play_Guide/TriplePlay-con-security.html, 9 pp.

"Triple Play Enhanced Subscriber Management," Alcatel-Lucent, retrieved on Oct. 5, 2016, from http://infodoc.alcatel-lucent.com/html/0_add-h-f/93-0098-09-01/7750_SR_OS_Triple_Play_Guide/TriplePlay-con-subscr_mgmt.html#427150m, 270 pp.

\* cited by examiner

REDUCING IMPACT OF NETWORK ATTACKS IN ACCESS NETWORKS

TECHNICAL FIELD

The invention relates to computer networks and, more specifically, to addressing attacks in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server or other device in each subnet may be responsible for allocating these network addresses in accordance with a network address allocation protocol, such as a dynamic host configuration protocol (DHCP).

Various types of network attacks exist that attempt to exploit operation of address allocation protocols. For example, a denial of service (DoS) attack may represent one type of attack that floods a DHCP server with address allocation requests. The DHCP server may be unable to distinguish between legitimate address allocation requests and illegitimate address allocation requests associated with the DoS attack. As such, the DHCP server may process each of the illegitimate address allocation requests, wasting computing and other resources that would be better allocated to processing legitimate address allocation requests. The DHCP server may, when processing resources are consumed processing the illegitimate address allocation requests, begin dropping all address allocation requests, preventing legitimate end users of the access network from gaining network connectivity to the subnet.

SUMMARY

In general, techniques are described for reducing the impact of network attacks in access networks. Rather than rely on policers (e.g., packet filters) that solely utilize device-specific information, such as media access control (MAC) addresses, that may be artificially generated (or, in other words, "spoofed"), a network device may install a policer in a forwarding plane that operates with respect to information inserted into packets by trusted network devices. The trusted network devices may be, for example, devices owned and operated by the service provider that insert into transient packets information that identifies a circuit by which the packets arrive at the trusted network device, where the circuit information corresponds to or otherwise identifies a sub-network (which may be referred to as a "subnet") of the access network from which the packet arrived. Examples of the circuit information include subnet address ranges, VLAN identifiers or tunnel header information transporting the received packets, and the like.

As a result of relying on trusted information that identifies, for example, the subnet of the access network from which the packet was originally received, a policer in the forwarding plane of an upstream network device may detect and respond to network attacks on a per circuit basis. For example, rather than drop all packets after detecting the network attack, the policer may only drop those packets having trusted information identifying the circuit associated with the network attack.

In this respect, the techniques may reduce the impact of network attacks in access networks by avoiding untrusted information that may consume processing resources in the control plane, while also preventing wholesale dropping of all packets across the entire access network in favor of only dropping packets associated with circuits associated with the network attack. The reliance on trusted information per various aspects of the techniques described in this disclosure may also prevent spoofing and other malicious practices that attempt to make malicious packets appear more legitimate, thereby further reducing the impact of network attacks.

In one aspect, a method for defending against a network attack comprises receiving, by a forwarding plane of a network device, a packet from a subscriber access device positioned at an edge of sub-network of an access network, the packet including trusted information inserted by an intermediate network device positioned between the network device and the subscriber access device. The method further comprises determining, by the forwarding plane and based on the trusted information, whether the packet is associated with the network attack, and forwarding, by the forwarding plane and based on the determination of whether the packet is associated with the network attack, the packet for subsequent protocol-specific processing.

In another aspect, a network device comprises an interface of a forwarding plane configured to receive a packet from a subscriber access device positioned at an edge of sub-network of an access network, the packet including trusted information inserted by an intermediate network device positioned between the network device and the subscriber access device. The network device further comprises a policer configured in a packet forwarding engine of the forwarding plane to determine, based on the trusted information, whether the packet is associated with the network attack, and forward, based on the determination of whether the packet is associated with the network attack, the packet for subsequent protocol-specific processing.

In another aspect, a non-transitory computer-readable storage medium has stored thereon instructions that, when executed, cause one or more processors of a forwarding plane included in a network device to receive a packet from a subscriber access device positioned at an edge of sub-network of an access network, the packet including trusted information inserted by an intermediate network device positioned between the network device and the subscriber access device, determine, based on the trusted information, whether the packet is associated with the network attack, and forward, based on the determination of whether the packet is associated with the network attack, the packet for subsequent protocol-specific processing.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
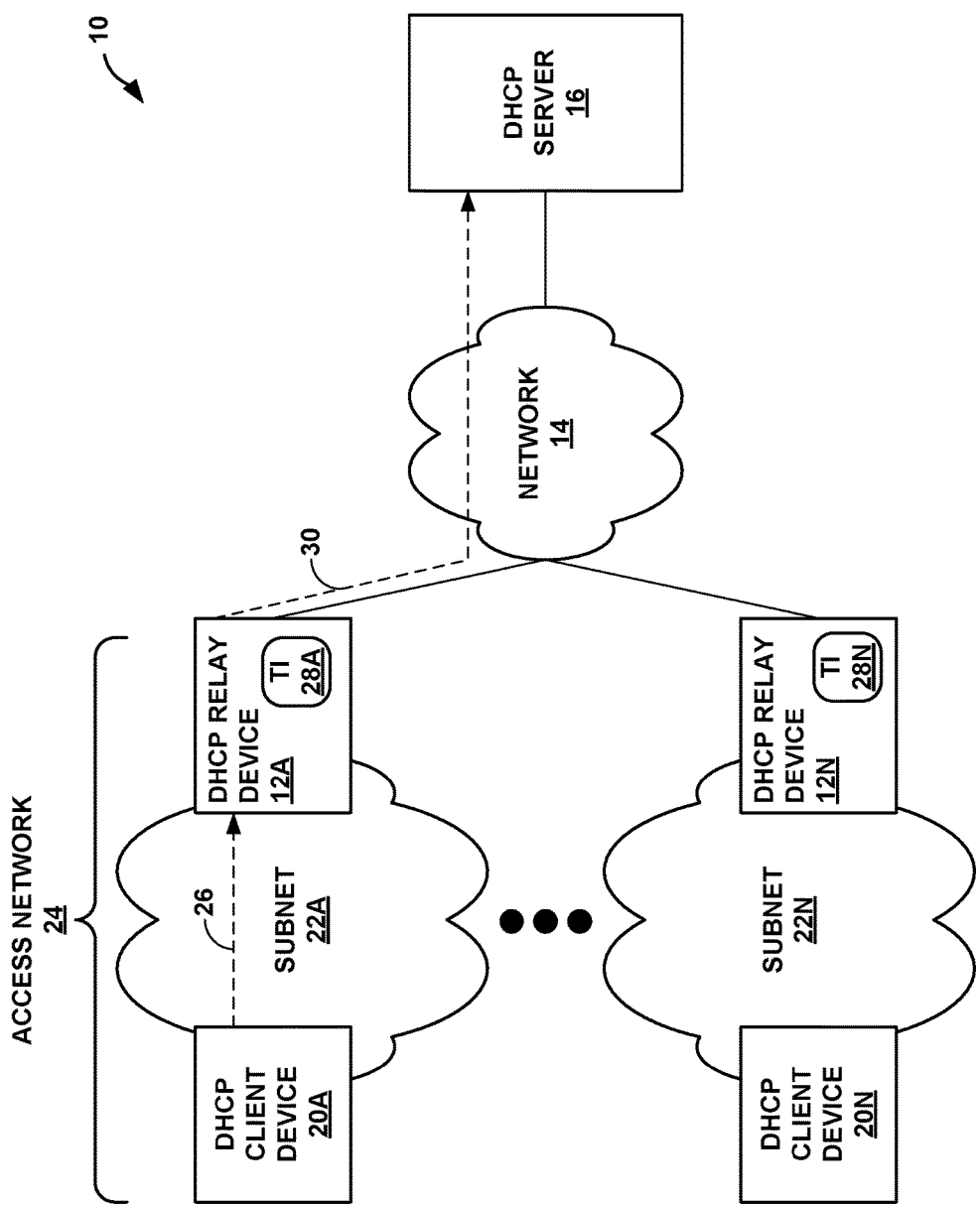
FIG. 1 is a block diagram illustrating an example network system configured to perform various aspects of the network attack reduction techniques described in this disclosure.

FIG. 1 is a block diagram illustrating a network system 10 in which a server 16 is configured to implement various aspects of the network attack reduction techniques described in this disclosure. In the example of FIG. 1, network system 10 includes Dynamic Host Configuration Protocol (DHCP) relay devices 12A-12N ("DHCP relay devices 12") and DHCP server 16. Although shown in the example of FIG. 1, as DHCP relay devices 12, the techniques of this disclosure may be implemented by any network device, such as a server, a router, a switch, a hub, a computer or any other device capable of receiving and communicating messages for the reservation of resources within a network system, such as network system 10. Moreover, while described with respect to a particular example protocol, e.g., DHCP, the techniques may apply to any protocol vulnerable to network attacks, such as a distributed denial of service (DDoS) attack.

As shown further in the example of FIG. 1, network system 10 includes a network 14, where DHCP relay devices 12 and a DHCP server 16 couple to network 14 via respective network links. Network 14 may represent any publicly accessible computer network, such as the Internet. Network 14 may include a wide variety of interconnected computing devices or nodes, such as web servers, print servers, application servers, data servers, workstations, desktop computers, laptop computers, cellular or other mobile devices, Personal Digital Assistants (PDAs), and any other device cable of connecting to a computer network via a wireless and/or wired connection. Typically, these devices communicate with one another via a packet-based protocol, such as an Internet Protocol (IP)/Transmission Control Protocol (TCP). As a result, network 14 may represent or be referred to as a "packet-based" or an "IP packet-based" computer network.

DHCP server 16 may represent a network device that allocates layer three network addresses (e.g., IP network addresses) for network system 10. In particular, DHCP server 16 may maintain access to an address pool, such as an Internet Protocol (IP) address pool. DHCP server 16 may also maintain access to other resources, such as configuration files that provide pertinent configuration information. DHCP server 16 may reserve an IP address within the IP address pool for use by one or more DHCP clients, such as DHCP client devices 20A-20N ("DHCP client devices 20"), in accordance with DHCP, as described in more detail below.

Network system 10 may further include DHCP client devices 20, each of which couple to DHCP relay 12 via one or more connections (not shown) included within sub-network 22 ("subnet 22"). DHCP client devices 20 may each represent a subscriber access device, such as one or more of a Set-Top Box (STB), a cable modem, a digital subscriber line modem, an optical node unit (or optical line unit) or any other type of device commonly employed by subscribers to facilitate access to network 14 via access network 24. Although described with respect to modems or set-top boxes, DHCP client devices 20 may also represent different types of subscriber access devices, such as a personal computer, a laptop computer, a tablet computer, a workstation, a personal digital assistant (PDA), a cellular phone or other mobile device (e.g., a so-called "smart phone") or any other device capable of accessing a network, such as network 14. These devices 20 may be "DHCP clients" in that these devices implement DHCP to request, as a client to the DHCP server or host device 16, L3 network addresses (e.g., IP addresses) and other resources maintained by DHCP server 16 useful or required for operating within network system 10.

Subnets 22A-22N ("subnets 22") may each represent a portion of access network 24, hence the name "subnet." Access network 24 is referred to as an access network given that this network enables client devices (not shown in the example of FIG. 1 for ease of illustration purposes) coupled to DHCP client devices 20 to access network 14. Generally, access network 24 implements the Internet protocol (IP), and with respect to IP, subnets or IP subnets, such as subnets 22, may be identified by an IP address prefix.

An IP subnet may represent a "network area" in that the IP subnet may be identified by a contiguous set of IP addresses or an IP prefix that defines a distinct area within an IP address space of larger access network 24. The IPv4 address space comprises $2^{32}$ distinct IP addresses, as each IP address may correspond to a 32-bit binary number. In some examples, an IP address is presented in four eight bit binary numbers (or, in other words, four bytes) with each eight-bit binary number or byte separated by a period (.), which is a notation referred to as a quad-dotted decimal representation. For example, one IP address may be presented as 10.0.0.1. However, as a byte may represent a number as large as $2^8-1$ or $255_{10}$, each byte may represent a range of numbers from 0 to 255 in decimal, such that each IP address may vary from 0.0.0.0 to 255.255.255.255 again in quad-dotted decimal representation or notation.

An IP prefix identifies a subset of addresses with the IP address space and those addresses may be assigned to devices within a particular area of larger access network 24. An IP prefix usually identifies a contiguous set of IP addresses within the IP address space. For example, an IP prefix may identify a contiguous set of IP addresses from 10.0.0.1 to 10.0.0.255. This IP prefix may be represented by a routing prefix or 10.0.0 followed by a subnet mask identifier (which in this instance may be represented as $24_{10}$ to indicate that the first 24 bits should be 1's within the subnet mask, e.g., 255.255.255.0 in quad-dotted decimal notation), where the prefix and scope identifier may be separated by a slash (/). The IP prefix may therefore be presented as 10.0.0/24 suggesting that only the first 24 bits of the 32-bit IP address are necessary to reach the IP subnet (or area) corresponding to the IP prefix. In this instance, the IP prefix may define a routing prefix and may represent a summarized version of the contiguous set of IP addresses.

According to DHCP, each of subnets 22 requires either a DHCP server, such as DHCP server 16, or a DHCP relay device, such as DHCP relay device 12, by which to reserve and assign IP addresses to network devices, such as DHCP client devices 20, operating within the respective subnet. As DHCP servers may maintain network resources for a large number of DHCP client devices, often, for small subnets, network administrators will utilize one or more DHCP servers or server clusters to service a number of subnets. To do so, the network administrators may maintain one DHCP server, such as DHCP server 16, in a central location and then configure multiple DHCP relay devices, one or more for each subnet, to relay DHCP messages from DHCP clients located within the respective one of the subnets to the single DHCP server or server cluster. More information regarding DHCP, including the different types of messages, can be found in request for comments (RFC) 2131, by R. Droms of Bucknell University, entitled "Dynamic Host Configuration Protocol," dated March 1997, the entire contents of which are hereby incorporated by reference in their entirety.

In these instances, a router or other network device (such as a digital subscriber line access multiplexer (DSLAM), a broadband service access node (BSAN), or a multi-service access node (MSAN)) already present within each subnet may provide the DHCP relay service as an optional service that the network administrators may enable in this context. In this respect, DHCP relay device 12 may represent a router or some other similar network device, such as a DSLAM, a BSAN, or an MSAN, that provides the DHCP relay service as an optional service. Alternatively, DHCP relay device 12 may represent a dedicated relay device and may represent any device capable of relaying DHCP messages in the manner described below in more detail. Thus, DHCP relay device 12 may represent any intermediate network device that is positioned between DHCP client devices 20 and DHCP server 16, and that implements DHCP to relay DHCP messages between DHCP clients 20 and DHCP server 16.

While described herein with respect to an intermediary DHCP relay device 12, the techniques may be employed by DHCP server 16 in instances where DHCP client devices 20 reside in the same subnet or network as DHCP server 16. Alternatively, in some instances, DHCP relay device 12 may implement only a portion of the techniques described below. Particularly, when DHCP relay device 12 is in a transparent snooping mode, DHCP relay device 12 may not issue any messages that otherwise alert DHCP client devices 20 and DHCP server 16 to its presence in the network, as it is transparent to DHCP client devices 20 and server 16.

Considering that an IP address is necessary to access network 14 via access network 24, DHCP client devices 20 may first access DHCP server 16 prior to being authorized to access network 14. Various types of network attacks exist that attempt to exploit the operation of address allocation protocols, such as DHCP. For example, a denial of service (DoS) attack (including a distributed DoS (DDoS)) may represent a type of attack that floods a DHCP server with address allocation requests. DHCP servers may be unable to distinguish between legitimate address allocation requests and illegitimate address allocation requests associated with the DoS attack. As such, DHCP servers may process each of the illegitimate address allocation requests, wasting computing and other resources that would be better allocated to processing legitimate address allocation requests. The DHCP servers may, when processing resources above some threshold are consumed processing the illegitimate address allocation requests, begin dropping all address allocation requests, preventing legitimate end users of the access network from gaining network connectivity to one or more subnets.

Two prevailing safeguards deployed today in broadband networks for defense against Denial of Service (DoS) attacks are use of a packet-level DoS policer and MAC address filtering. When using a packet-level DoS policer, the administrator configures the policers on a data plane (which may also be referred to as the "forwarding plane") of the router executing the DHCP server. The policer may limit the number of packets processed, either by a control plane of the router or by the data plane itself. Limiting the number of packets processed may reduce the number of packets associated with the DoS that are processed such that the malicious packets associated with the DoS do not consume all the processing resources of either the control plane or the data plane. As such, legitimate subscribers may not be completely denied access to the network.

Although described below as reducing the number of packets forwarded to and processed by the control plane, the techniques may be performed in other instances in which the data plane processes the packets. In instances where the data plane card implements DHCP to process packets, the policer may reduce the number of packets that are forwarded to the DHCP unit of the data plane card, thereby reducing processing of malicious packets and allowing legitimate subscribers to access the network.

The DoS policer may drop the packets based on the overall rate of the packets, the specified protocol, and/or the rate for the specified protocol. The administration may not configure the policer rate at an overly high rate as the network attack may succeed in overloading the control plane. However, the administrator may not configure the policer rate at an overly low rate, as too low of a policer rate may impact a call set up rate (which may refer to a rate at which DHCP sessions are configured) by design/configuration. Given a desire for high performance, the administrator may configure the policer rate at a rate slightly higher than an expected call setup rate—which may as one example be in the area of hundreds of protocol packets for a particular protocol type (e.g., PPP, DHCP, L2TP, etc.) per unit of time (e.g., specified in terms of one or more minutes, one or more seconds, one or more milliseconds, etc.).

When using a MAC address filtering, the control plane of the router implementing the DHCP server compares MAC addresses specified by incoming packets against MAC addresses associated with existing subscriber access devices. That is, the control plane may compare a MAC address specified in each packet against a list of MAC addresses associated with known subscriber equipment (e.g., which may refer to DHCP client devices 20A, 20B). When the MAC address of the packet matches the MAC addresses currently used by known subscriber equipment, the DHCP server may process the packet. When the MAC address of the packet does not match any of the MAC addresses used by any of the known subscriber equipment, the DHCP server may determine that the packet is part of a DoS attack, and drop the packet.

In accordance with the techniques described in this disclosure, DHCP server 16 may attempt to reduce network attacks using policers that filter packets based on trusted information. Rather than rely on MAC addresses, which may be artificially generated to be the same as a MAC address associated with DHCP client devices 20 and thereby thwart MAC address filtering, DHCP server 16 may filter packets based on trusted information inserted by DHCP relay device 12. This trusted information (which may also be referred to as "trusted network information") is deemed "trusted" because the intermediate DHCP relay devices 12, which are under the control of a service provider and are difficult to tamper with or otherwise alter for malicious purposes, inserts the information into each packet from the DHCP client devices 20 prior to forwarding the packet to DHCP server 16.

Furthermore, rather than rely on policers that may result in all traffic being dropped upon detecting of packet rates that violate the packet rate threshold, DHCP server 16 may rely on trusted information that identifies one or more of subnets 22 such that only packets from subnets 22 participating in a network attack are dropped. In this respect, DHCP server 16 may still allocate IP addresses to DHCP client devices 20 of subnets 22 not associated with or otherwise identified as participating in the network attack.

In operation, DHCP client device 20A may forward one or more DHCP packets 26 requesting that an IP address be allocated for use by DHCP client device 20A. DHCP relay device 12A may receive the DHCP packets 26 and update the DHCP packets 26 to add trusted information 28A ("TI 28A").

Each of DHCP relay devices 12 may be configured with unique (within the domain of access network 24) trusted information 28A-28N ("trusted information 28" or "TI 28"). For example, each one of trusted information 28 may comprise configuration information specifying access interfaces of the DHCP device 12. In the example of FIG. 1, trusted information 28A may represent configuration data specifying an access interface by which DHCP packets 26 arrive at DHCP relay device 12A. In this way, each one of trusted information 28 may by used by upstream devices to identify a source of the network attack in terms of an access interface on which the respective DHCP relay device 12 received the DHCP request packets. Although described with respect to an access interface, the techniques may be performed with respect to any information inserted by an intermediately positioned, trusted network device that identifies a source of the network attack. Examples of the other forms of trusted information include subnet address ranges, VLAN identifiers or tunnel header information transporting the packets as received by DHCP relay devices 12.

According to the techniques described herein, an administrator of access network 24 may configure each of DHCP relay devices 12 with respective TI 28 to uniquely identify each of subnets 22 in terms of the access interface. Examples of TI 28 may include one of an agent circuit identifier (ACI), an agent remote identifier (ARI), or both an ACI and an ARI (ACI/ARI). TI 28 may, in other words, identify a different circuit over which DHCP packets 26 were received by DHCP relay device 12, where each circuit may correspond generally to a different one of subnets 22.

Although described in this disclosure with respect to a particular type of trusted information 28 (i.e., ACI/ARI), the techniques may be performed with respect to any type of trusted information inserted by intermediate network devices 12 under the control of the service provider. For example, intermediate network devices 12 may perform deep packet inspection (DPI) and insert other types of trusted information identifying subnets 22 or particular subsets of client devices 20. As such, the techniques may be performed with respect to any type of trusted information that is inserted into packets by trusted intermediate network devices 12.

After adding trusted information 28A, DHCP relay device 12A may forward updated DHCP packets 30 to DHCP server 16 via network 14. A router, such as a router referred to as a broadband network gateway (BNG), may implement, execute, or interface with DHCP server 16. The BNG may include a forwarding plane and a control plane, where the administrator configures a policer in the forwarding plane that performs the techniques described in this disclosure to filter packets based on trusted information 28. As such, the forwarding plane of the BNG may receive updated DHCP packets 30 from DHCP client device 20A positioned at an edge of subnet 22A of access network 24.

The policer configured in the forwarding plane may next determine whether updated DHCP packets 30 are associated with the network attack based on TI 28A. The administrator may configure the policer with a packet rate threshold per access interface identified by TI 28A. When the rate of packets per access interface equals or exceeds (or in some instances only exceeds) the packet rate threshold per access interface, the policer may identify a network attack as originating from the one of subnets 22 identified by the corresponding one of TI 28.

In the example of FIG. 1, the policer may determine whether DHCP packets 30 along with other DHCP packets from subnet 22A equal or exceed the configured packet rate threshold. When the packet rate from subnet 22A (as identified by TI 28A) does not equal or exceed the configured packet rate threshold, the policer may forward the packet to DHCP server 16. When the packet rate from subnet 22A equals or exceeds the configured packet rate threshold, the policer may drop DHCP packets 30 and any other DHCP packets having TI 28A inserted into such packets. In other words, the policer configured in the forwarding plane of the router which may be BNG executing DHCP server 16 may forward, based on the determination, the packet to DHCP server 16 executed in the control plane for protocol-specific processing of the packet.

As discussed briefly above, the administrator may configure the policer to have protocol specific packet rate thresholds, where the packet rate threshold apply only to packets conforming to a particular protocol, i.e., DHCP in the example above. Although described in this disclosure with respect to DHCP, the techniques may apply to any type of protocol susceptible to DoS and other types of network attacks that attempt to consume a particular network resource, such as a point-to-point protocol (PPP), PPP over Ethernet (PPPoE), layer two (L2) tunneling protocol (L2TP), etc.

In this way, the policer in the forwarding plane executing DHCP server 16 is enhanced to protect protocol-specific processing resources (which in this example is assumed to execute in the control plane) by filtering DHCP packets 30 based on TI 28. The control plane, which handles signaling protocol execution, may not, as a result of this protection become overloaded and begin dropping all DHCP packets from all subscriber access equipment. Rather, the control plane may continue to perform protocol-specific processing of DHCP packets from those subnets 22 not associated with the network attack, thereby allowing genuine subscribers from the rest of access network 24 serviced by DHCP sever 16 to access network 14.

Figure 2:
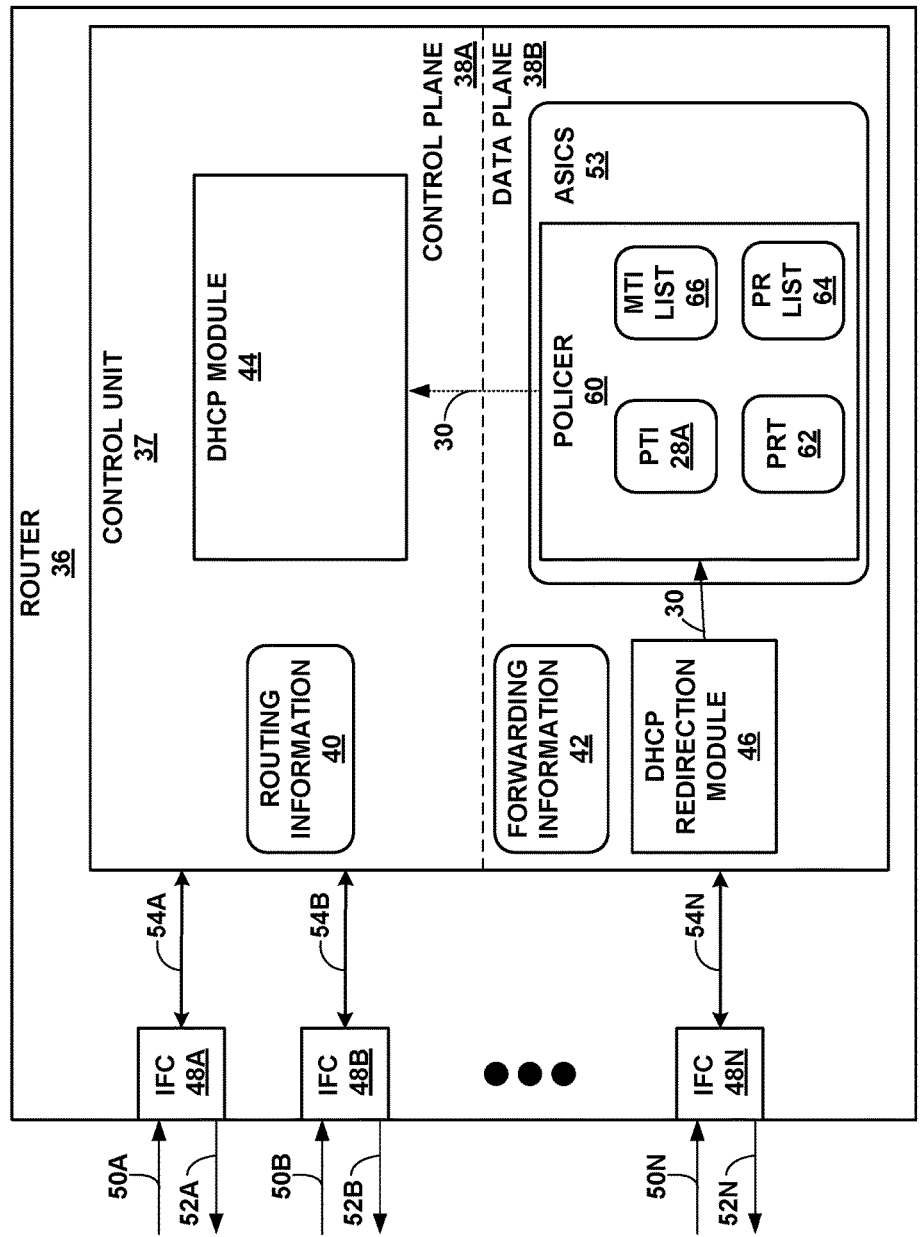
FIG. 2 is a block diagram illustrating an example of a router shown in FIG. 1 that implements the network attack reduction techniques described in this disclosure.

FIG. 2 is a block diagram illustrating an example of a router 36 that implements the network attack reduction techniques described in this disclosure. Router 36 may represent any network device that performs routing functions to route data units through a network. Router 36 may route particular types of data units referred to as packets and as a result may be referred to as a "packet-based router."

Moreover, router 36 may implement layer 3 (L3) protocols or network layer protocols (where L3 refers to the L3 of the open system interconnection (OSI) model), such as an Internet Protocol (IP), and route packets according to layer 3 information. Consequently, router 36 may also be referred to as a "layer 3 router", a "network layer router," or an "IP router." Moreover, router 36 may represent an example embodiment of DHCP server 12 of FIG. 1. For purposes of illustration, router 36 may be described below within the context of exemplary network system 10 of FIG. 1.

Additionally, router 36 may represent an example of a broadband network gateway (BNG), which may also be referred to as a broadband remote access server (BRAS). Acting as a BNG, router 36 may aggregate user sessions from access network 24, and perform policy management and IP quality of service (QoS) with respect to the user sessions.

As shown in FIG. 2, router 36 includes a control unit 37. Control unit 37 may comprise one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Control unit 37 may also include, either as an alternative to the one or more processors or in addition to the one or more processors, dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 37 may be divided into two logical or physical "planes" to include a first control or routing plane 38A and a second data or forwarding plane 38B. That is, control unit 37 may implement two separate functionalities, e.g., the routing and forwarding functionalities, either logically, e.g., as separate software instances executing on the same set of hardware components, or physically, e.g., as separate physical dedicated hardware components (which may be referred to as "packet forwarding engines," abbreviated as "PFEs") that either statically implement the functionality in hardware or dynamically execute software or a computer program to implement the functionality.

Control plane 38A of control unit 37 may execute the routing functionality of router 36. In this respect, control plane 38A may represent hardware and/or software of control unit 37 that implements routing protocols (not shown in FIG. 2) by which routing information 40 may be determined. Routing information 40 may include information defining a topology of a network, such as network 14. Control plane 38A may resolve the topology defined by routing information 40 to select or determine one or more routes through network 14. Control plane 38A may then update data plane 38B with these routes, where data plane 38B maintains these routes as forwarding information 42. Routing component 26 may generate the forwarding information (FIB) 42 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

Forwarding or data plane 38B may represent hardware (e.g., the above noted PFEs) and/or software of control unit 37 that forwards network traffic in accordance with forwarding information 42.

Control plane 38A may further comprise a DHCP module 44 that implements DHCP in the manner described above with respect to DHCP server 16 of FIG. 1. In other words, DHCP module 44 may receive DHCP messages, such as DHCP messages 30, and process these messages in accordance with DHCP. More information concerning DHCP in general as well as particulars concerning DHCP messages, such as DHCP discover, offer, request, release, renew, acknowledge and other messages can be found in Request for Comments (RFC) 2131, titled "Dynamic Host Configuration Protocol," dated March 1997, herein incorporated by reference in its entirety.

Data plane 38B may comprise a DHCP redirection module 46. DHCP redirection module 46 may represent a software and/or hardware module that inspects incoming network traffic to determine if this incoming network traffic represents DHCP messages. DHCP redirection module 46 may, in some instances, comprise a logic programmed within a forwarding ASIC (representative of PFEs) or other component of data plane 38B that filters traffic based on headers of the incoming network traffic or any other similar mechanism that data plane 38B may employ to distinguish particular types of network traffic from other types of network traffic.

DHCP redirection module 46 may for example comprise one or more filters programmed within data plane 38B that listens on one or more ports assigned for DHCP communications, e.g., ports 67 and 68. DHCP redirection module 48 may comprise one filter that listens on these DHCP ports 67 and 68, and upon receiving traffic over these ports, DHCP redirection module 48 may determine an address to which the DHCP communications are transmitted. DHCP clients 20 may, for example, transmit the DHCP messages by broadcasting these DHCP messages over one of the above ports. DHCP redirection module 48 may, therefore, filter packets that indicate a broadcast address, e.g., an address of zero, and designate one of the DHCP ports. DHCP messages from server 16 may specify particular interfaces of router 36 by address and also designate one of the above DHCP ports. DHCP redirection module 46 may likewise filter DHCP messages that include one of the interface addresses and one of the DHCP ports. DHCP redirection module 46 may therefore filter packets in this manner and forward DHCP messages 30 to control unit 37.

As further shown in FIG. 2, router 36 includes Interface Cards (IFCs) 48A-48N ("IFCs 48") that receive and send packet flows or network traffic via inbound network links 50A-50N ("inbound network links 50") and outbound network links 52A-52N ("outbound network links 52"), respectively. IFCs 48 are typically coupled to network links 50, 52 via a number of interface ports (not shown), and forward and receive packets and control information from control unit 37 via a respective one of paths 54A-54N ("paths 54"). Each physical interface of IFCs 48 is typically assigned a unique identifier by control unit 37, and multiple logical interfaces having unique identifiers may be assigned to each physical interface, where each logical interface represents as a distinct input or output interface for different network traffic. These logical interfaces may represent VLANs and each VLAN may be assigned a unique VLAN tag. Often, each particular context in which a DHCP client devices resides is assigned a VLAN tag to differentiate between client devices of different context.

Router 36 may include a chassis (not shown in FIG. 2) having a number of slots for receiving a set of cards, including IFCs 48. Each card may be inserted into a corresponding slot of a chassis for communicably coupling the card to a control unit 36 via a bus, backplane, or other electrical communication mechanism.

Initially, router 36 may receive network traffic, e.g., DHCP packets 30, via inbound network links 50 from a DHCP client device, such as DHCP client device 20A. DHCP redirection module 46 may then filter or otherwise perform operations to determine whether the incoming network traffic includes DHCP messages, such as DHCP messages 30. DHCP redirection module 46 may inspect the incoming network traffic and identify DHCP packets 30 based on the format of DHCP messages, as set out in detail in the above incorporated RFC 2131.

DHCP redirection module 46, upon detecting one or more DHCP message within the incoming network traffic, may forward either the DHCP message or a copy of the DHCP message to policer 60. Although described as performing separate operations, policer 60 may include DHCP redirection module 30. Alternatively, DHCP redirection module 30 may include policer 60.

In the example of FIG. 2, policer 60 within data plane 38B of router 35 is configured and operable within one or more hardware forwarding ASICs 53. In this example, ASICs 53 are microcode-controlled chipsets programmably configured by a control unit 37. When forwarding packets, control logic of ASICs 53 traverses forwarding information 42 and, upon reaching a FIB entry for the packet (e.g., a leaf node of a radix tree), forwarding ASICs 53 automatically forward the packet to forwarding next hop(s). Examples of routers having forwarding ASICs are described in U.S. Pat. No. 8,837,479, the entire contents of which are incorporated herein by reference. Further example details of a forwarding plane of a router are described in U.S. Pat. No. 7,990,993, entitled "PLATFORM-INDEPENDENT CONTROL PLANE AND LOWER-LEVEL DERIVATION OF FORWARDING STRUCTURES," the entire contents of which are incorporated herein by reference. One example of a router including a packet processing engine having multiple microcode instruction memories is described in U.S. Pat. No. 6,976,154, the entire contents of which are incorporated herein by reference.

As shown in this example, policer 60 is installed within ASICs 53 within an internal forwarding path of the hardware-ASICs 53 that perform lookups and packet forwarding operations. As described herein, the administrator responsible for configuring policer 60 may, as noted above, define a packet rate threshold 62 ("PRT 62"). In some examples, the administrator may configure a different packet rate threshold 62 for each of set of trusted information 28 (or, in other words, each of subnets 22 identified by corresponding trusted information 28). In other examples, the administrator may configure a different packet rate threshold 62 for one or more of PTI 28 (or, in other words, for one or more of subnets 22 identified PTI 28).

Moreover, the administrator may configure policer 60 with protocol-specific packet rate threshold that apply only to packets conforming to a particular protocol (i.e., DHCP in the example of FIG. 2). Policer 60 may be configured in some examples with different protocol-specific packet rate thresholds for each particular protocol (e.g., PPP, PPPoE, DHCPv6, layer two (L2) tunneling protocol (L2TP), etc.). Alternatively or in conjunction with protocol-specific packet rate threshold, the administrator may configure policer 60 with an independent packet rate threshold that applies to packet rates of packets conforming to two or more different protocols (e.g., DHCP, DHCPv6, PPP, PPPoE, L2TP, etc.). In the example of FIG. 2, it is assumed for ease of illustration that the administrator has configured policer 60 with a single packet rate threshold 62 (which may also be referred to as a "policer threshold rate").

Policer 60 may maintain (which may refer to storing, updating, and evaluating) a packet rate list 64 ("PR list 64"). Packet rate list 64 may store a packet rate per trusted information 28 (which again may represent one or both of ACI and ART). Policer 60 may, upon receiving DHCP packets 30, parse trusted information 28A from DHCP packets 30 (which is shown as parsed trusted information (PTI) 28A in the example of FIG. 2). Policer 60 may update an entry in PR list 64 keyed by trusted information 28A to reflect the receipt of DHCP packets 30, potentially incrementing the packet rate.

After updating the corresponding entry in PR list 64 keyed to trusted information 28A, policer 60 may evaluate each entry in PR list 64, comparing each entry in PR list 64 to packet rate threshold 62 to determine whether any of trusted information 28 are associated with a network attack. When one of the packet rates stored to the entries in PR list 64 equal or exceed packet rate threshold 62, policer 60 may add an entry (or, if already added, maintain a previous entry) to malicious trusted information (MTI) list 66. Policer 62 may maintain (which again may refer to storing, updating, and evaluating) malicious trusted information list 66 such that each entry of malicious trusted information list 66 specifies one of trusted information 28 having been identified as potentially originating a network attack.

In response to identifying a circuit as originating a network attack, policer 60 may interface with control plane 38A to, as one example, alert an administrator that a network attack was detected. The administrator may monitor the network traffic and, upon determining that the network attack has stopped, remove the entry in malicious trusted information list 66 to remove the entry corresponding to PTI 28 identifying the circuit originating the network attack.

Although described as maintaining each of packet rate lists 64 and malicious trusted information list 66 in response to respectively receiving DHCP packets 30 and updating packet rate lists 64, the techniques may be performed in different ways or in different orders. As a couple of examples, policer 60 may perform the maintenance of packet rate lists 64 and/or malicious trusted information list 66 based on polling intervals, interrupts from other units of control unit 37, or any other form of scheduled or event driving intervals.

Furthermore, policer 60 may not maintain packet rate list 64 in conjunction with malicious trusted information list 66 (or as a result of updating packet rate list 64). Policer 60 may, in other words, update packet rate list 64 in response to receiving DHCP packets 30, but only compare each of the packet rates stored to entries of packet rate list 64 to packet rate threshold 62 in some defined interval (e.g., every 30 seconds, 1 minute, etc.) defined by the administrator or auto-configured to potentially optimize workloads. In this respect, policer 60 may update malicious trusted information list 66 periodically, while updating packet rate list 64 responsive to receipt of DHCP packets 30.

Again, although described as being performed with respect to a particular protocol (i.e., DHCP in the example of FIG. 2) for ease of explanation purposes, the techniques may be performed irrespective of a particular protocol. In other words, policer 60 may police packets irrespective of a particular protocol, and only on trusted information (as the network attack may attempt to exploit a number of different protocols, such as PPP, DHCPv6, L2TP, etc.). The techniques may generally apply to any packet having trusted information 28.

In this respect, policer 60 may analyze packets conforming to one or more different protocols. Policer 60 may determine an aggregate packet rate that aggregates the packet rates across two or more different protocols. Policer 60 may be configured with an aggregate packet rate threshold, to which policer 60 compares the determined aggregate packet rate to determine whether a network attack is occurring within a particular circuit identified by PTI 28.

In any event, policer 60 may next determine whether DHCP packets 30 are associated with a network attack. Policer 60 may parse trusted information 28A from DHCP packets 30, and compare parsed trusted information 28A to malicious trusted information list 66. In some examples, policer 60 may access an entry of malicious trusted information list 66 based on parsed trusted information 28A. When malicious trusted information list 66 indicates that parsed trusted information 28A is associated with a network attack, policer 60 may determine that DHCP packets 30 are associated with the network attack. As a result of this determination that DHCP packets 30 are associated with the network attack, policer 60 may drop DHCP packets 30, thereby preventing DHCP packets 30 from reaching DHCP module 44 for protocol-specific processing in control plane 38A and wasting computing and memory resources of control plane 38A.

In response to determining that the network attack is occurring, policer 60 may also, as noted above, interface with control plane 38A to issue an alert informing an administrator of the attack. In addition, policer 60 may log the network attack with various information, including TI 28, and other packet header information. Policer 60 may, furthermore, interface with a threat management system to coordinate system wide threat prevention, or perform any other operation commonly deployed in response to detecting a network attack.

When malicious trusted information list 66 indicates that parsed trusted information 28A is not associated with a network attack, policer 60 may determine that DHCP packets 30 are not associated with the network attack. As a result of this determination that DHCP packets 30 are not associated with the network attack, policer 60 may forward DHCP packets 30 to DHCP module 44 for protocol-specific processing in control plane 38A. DHCP module 44 may perform protocol-specific processing and generate DHCP packets responsive to DHCP packets 30. DHCP module 44 may forward the responsive DHCP packets back to DHCP client device 20A.

Although described as performing packet rate limiting based solely on PTI 28, policer 60 may employ a more sophisticated mechanism that also utilizes MAC address filtering (which may also be referred to as "MAC address validation"), caching MAC addresses for a finite time and using those MAC addresses to compare against incoming DHCP packet 30. Any new DHCP packet 30 that has the same ACI, but different MAC address may indicate MAC address spoofing (which refers to an artificially generated MAC address) is being used. Because the attack has to be reasonably fast to succeed, policer 60 may establish rules on how much to age the MAC address cache, potentially reducing an amount of memory required to store the cache.

While described as incorporating MAC address validation, the techniques may be performed with respect to any field or combination of fields specifying, for example, MAC addresses, interface identifiers, virtual routers, etc. The techniques may therefore utilize trusted information in conjunction with any other field, including those specifying other trusted information or those specifying untrusted information.

Figure 3:
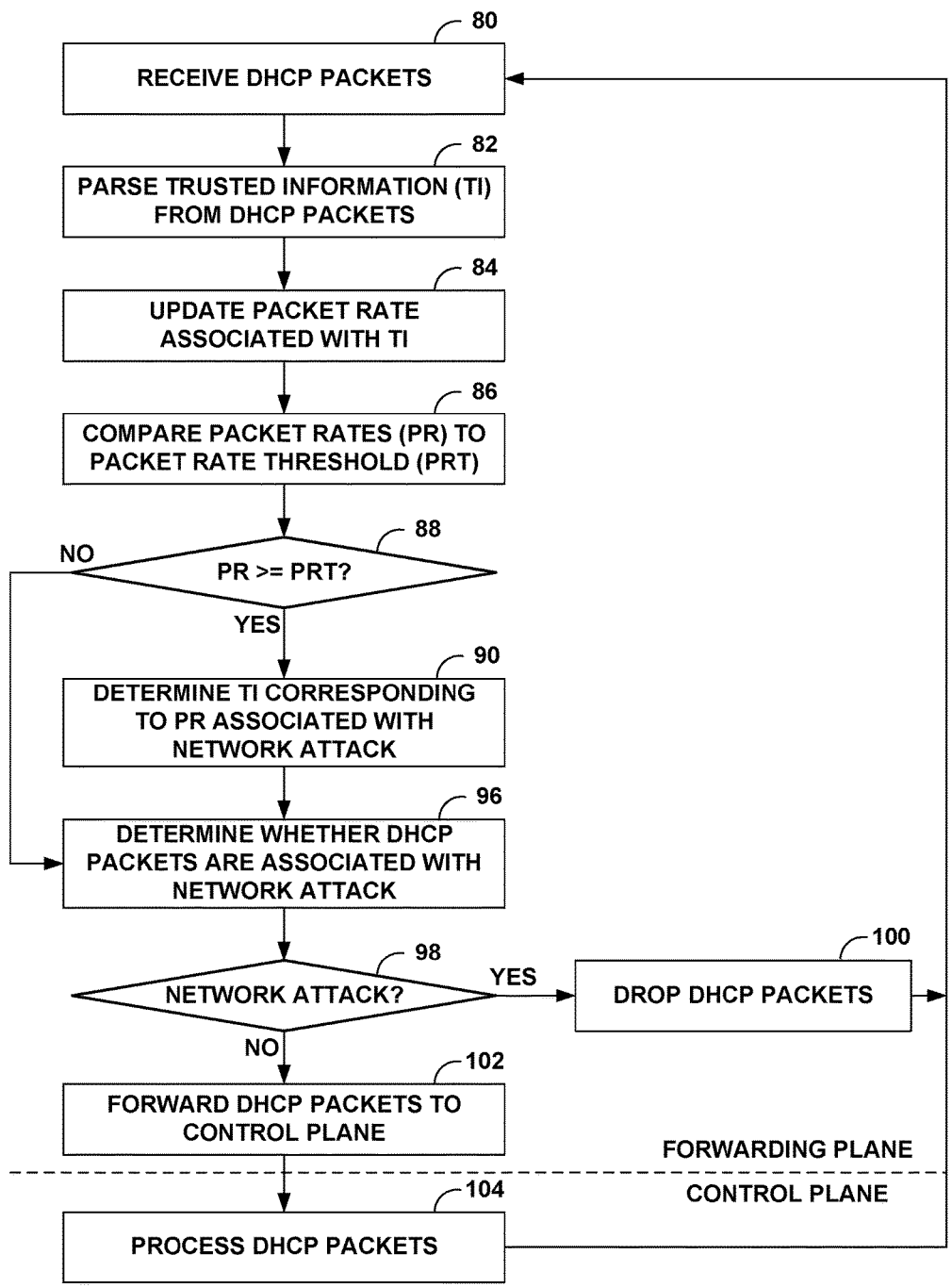
FIG. 3 is a flowchart illustrating exemplary operation of the router of FIG. 2 in performing various aspects of the network attack reduction techniques described in this disclosure.

FIG. 3 is a flowchart illustrating exemplary operation of router 36 of FIG. 2 in performing various aspects of the network attack reduction techniques described in this disclosure. Initially, router 36 may receive network traffic, including DHCP packets 30, via inbound network links 50 from DHCP client device 20A (80). In particular, IFCs 48 coupled to respective inbound network links 50 may receive the network traffic, whereby each of IFCs 48 forward the network traffic to data plane 38B. DHCP redirection module 46 may then filter or otherwise perform operations to determine whether the incoming network traffic includes DHCP messages, such as DHCP packets 30. DHCP redirection module 46, upon detecting one or more DHCP packets 30 within the incoming network traffic, may forward either DHCP packets 30 to policer 60.

Policer 60 may, upon receiving DHCP packets 30, parse trusted information 28A from DHCP packets 30 (which is shown as parsed trusted information (PTI) 28A in the example of FIG. 2) (82). Policer 60 may update a packet rate stored to an entry in PR list 62 associated with trusted information 28A to reflect the receipt of DHCP packets 30 (84).

After updating the corresponding entry in PR list 64 keyed to trusted information 28A, policer 60 may evaluate each entry in PR list 64, comparing each entry in PR list 64 to packet rate threshold 62 to determine whether any of trusted information 28 are associated with a network attack (86). When one of the packet rates stored to the entries in PR list 64 equal or exceed packet rate threshold 62 ("YES" 88), policer 60 may determine that the trusted information corresponding to the packet rate (determined to exceed the packet rate threshold 62) is associated with a network attack (90). As such, policer 60 may store this determination of a network attack association by adding an entry (or, if already added, maintain a previous entry) to malicious trusted information (MTI) list 66.

When one of the packet rates stored to the entries in PR list 64 are below packet rate threshold 62 ("NO" 88), policer 64 may not update malicious trusted information list 66 to include an entry corresponding to PTI 28A. Whether updating malicious trusted information list 66 or not, policer 60 may determine whether DHCP packets 30 are associated with a network attack, traversing malicious trusted information list 66 to determine whether an entry of malicious trusted information list 66 identifies PTI 28A (96). When malicious trusted information list 66 indicates that parsed trusted information 28A is associated with a network attack ("YES" 98), policer 60 may drop DHCP packets 30 (100), thereby preventing DHCP packets 30 from reaching DHCP module 44 in control plane 38A for protocol-specific processing and wasting computing and memory resources of control plane 38A.

When malicious trusted information list 66 indicates that parsed trusted information 28A is not associated with a network attack ("NO" 98), policer 60 may forward DHCP packets 30 to DHCP module 44 in control plane 38A (102). DHCP module 44 may process the DHCP module 44 and generate DHCP packets responsive to DHCP packets 30 (104). DHCP module 44 may forward the responsive DHCP packets back to DHCP client device 20A.

In this respect, the techniques may reduce the impact of network attacks. However, a DoS attack can still be achieved in spite of the above described techniques. A DoS attack can be mounted on DHCP server 16 (as implemented by a router 36 by way of DHCP module 44) at a rate slightly lower packet rate threshold 62 configured for policer 60.

In these instances, policer 60 may not detect any violation as the attack is not detectable by policer 60 considering that each of DHCP packets 30 appears legitimate in that the attack remains under the policer rate and may not use the same MAC address. DHCP module 44 may not detect any duplication of MAC addresses, and thus allocate addresses to malicious DHCP client device 20A. Thus, slowly and gradually the DoS attack may succeed in denial of service to legitimate subscribers with the controlled rate to slowly erode DHCP module 44.

Yet, the techniques described in this disclosure may prevent a single attack from effecting the entirety of access network 24. Instead, policer 60 may only drop packets associated with detected malicious trusted information stored to malicious trusted information list 66. As such, a single DoS attack from any part of access network 24 may not affect all the subscribers and bring down access network 24 in its entirety over a period of time.

As such, the techniques may enable a fairly high level (e.g., above interface level MAC address filtering, or subscriber specific interface level MAC address filtering) of aggregation level filtering that reduces the impact of DoS attacks without the requirements necessitated by lower more granular levels of filtering. That is, when policers are applied at the interface level, many networks are aggregated by devices like DSLAM, BSAN or MSAN before reaching router 36. The DoS may, as a result, affect router 36 implementing DHCP server 16.

Alternatively or in conjunction with interface level policers, some service providers may deploy policers based on number of packets per MAC address, e.g., by defining a policer at the subscriber level. However, MAC addresses can be artificially generated (which is commonly referred to as "spoofed"), rendering MAC address verification ineffective. Moreover, considering that the number of MAC addresses to be matched in data plane 38B by the policer may require a large cache, MAC address based validation may be both costly and potentially ineffective.

The proposed techniques described in this disclosure leverage network configurations that deploy layer two DSLAM (Digital Subscriber Line Access Multiplexer), BSAN (Broadband Service Access Node) or MSAN (Multi-Service Access Node) at the boundary of the trusted network (e.g., network 14). These network elements are physically, administratively and operationally owned and managed by the service providers operating access network 24. These devices, which are represented in the example of FIG. 1 as DHCP relay devices 12, terminate the local circuit for the subscriber network and carry the subscriber network traffic on trusted network 14.

As described above, devices 12 may insert two fields referred to as an Agent Circuit Identifier (ACI) field and an Agent Remote Identifier (ARI) field in the control packets being forwarded to the DHCP server 16. ACI contains an agent-local identifier of the circuit from which the packet was received. ARI identifies the remote host-end of the circuit. ACI/ARI are thus the fields inserted by trusted devices 12 (where "trusted" is used to denote that device 12 is under the control of the service provider rather than a malicious user) in the network and cannot be spoofed. Device 12 may be configured to drop the packets which already contain ACI/ARI, thus reducing the chance of spoofing ACI/ARI.

Policer 60 represents an enhanced policer configured to operate at the level of the trusted network by including the ACI/ARI in the policy rather than only at the protocol (entire network) level. As such, the number of ACI/ARIs are much more limited than the number of MAC addresses, thereby reducing an extent of memory required to maintain trusted information 28. Every client would have a unique MAC, but ACIs/ARIs are more related to the number of devices 12 in a network. As an example, when there can be a hundred thousand subscribers connected to DHCP server 16, there may be only a hundred unique access interfaces identified by trusted information 28 (e.g., ACI/ARI combinations).

Even when the malicious attacker tries to spoof MAC addresses in DHCP packets 30 mounting the DoS attack on DHCP server 16, enhanced policer 60 will stop dropping packets for a particular circuit based on ACI/ARI 28, thus restricting the DoS only to the small portion of the network where that particular circuit terminates rather than affecting access network 24 in its entirety.

As shown in the example of FIG. 3, enhanced policer 60 may perform ACI/ARI based detection at forwarding plane 38B of DHCP server 16 such that DHCP packets 30 may be dropped at a line card of forwarding plane 38B rather than allow exhaustion at control plane 38A to occur. Although not explicitly shown in FIG. 2, forwarding plane 38B may include one or more packet forwarding engines (PFEs) configured to parse and decode DHCP packets 30 to identify ACI/ARI fields 28. The PFE may execute policer 60 which performs rate limiting of protocol packets per ACI/ARI 28, e.g. rate limit DHCP packets 30 received from/containing same ACI/ARI. When the packet rate exceeds packet rate threshold 62, policer 60 may determine that DHCP client devices 20 are either faulty or associated with a DoS attack. In this respect, detection is based on a plain rate of protocol messages for an ACI/ARI.

In this way, the second defense of MAC address validation performed at control plane 38A may not be not necessary, thereby potentially reducing an amount of processing at control plane 38A. None of the previous ways of detecting the DoS attacks may be required where there is the "trust" element in the packets in the form of the ACI/ARI 28. The techniques may further enable DHCP packets 30 determined to be associated with the DoS attack to be dropped right at forwarding plane 38B, rather than always proceed to control plane 38A for protocol processing.

Figure 4:
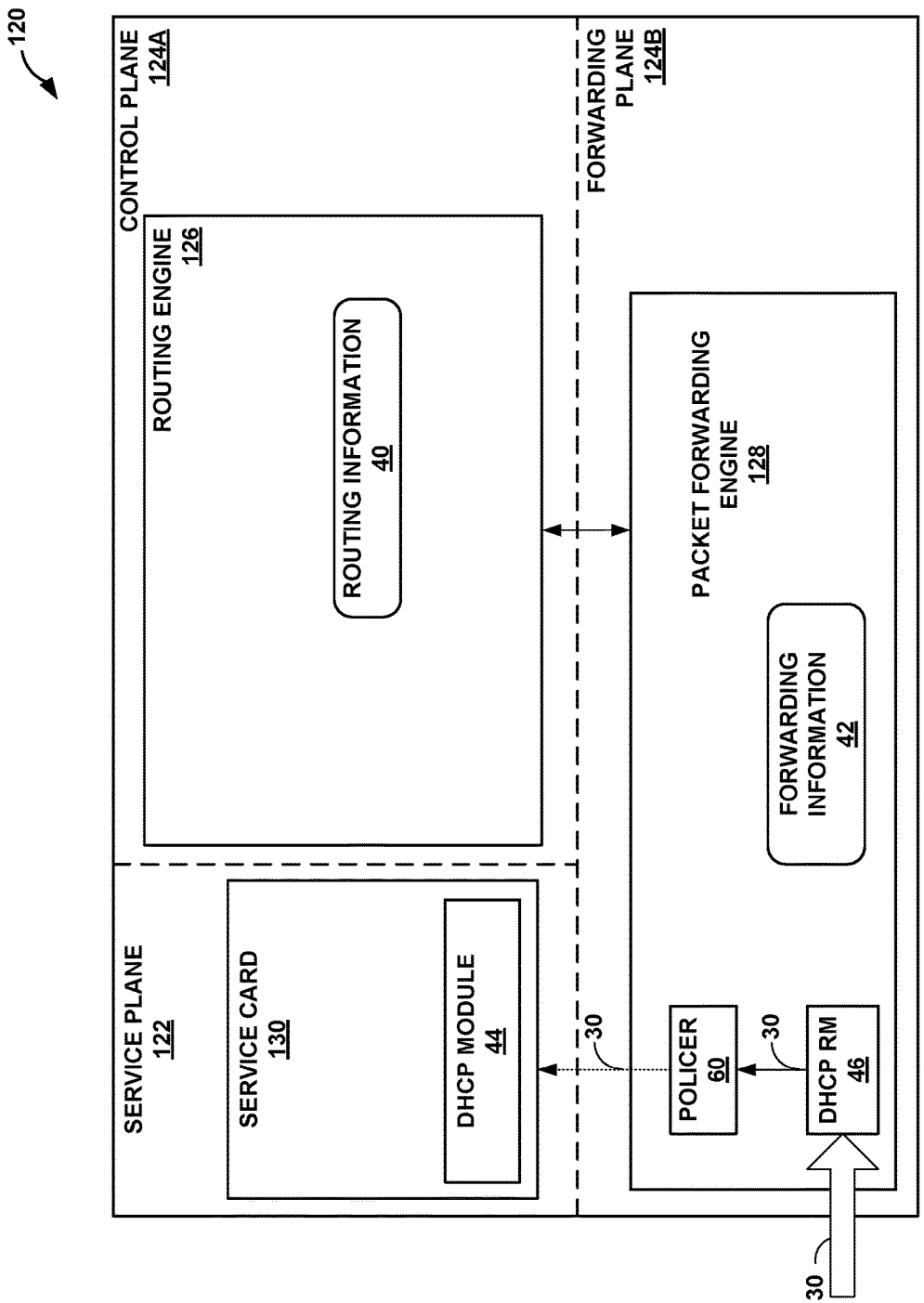
FIG. 4 is a block diagram illustrating another example of a router configured to perform various aspects of the network attack reduction techniques described in this disclosure.

FIG. 4 is a block diagram illustrating another example of a router 120 configured to perform various aspects of the network attack reduction techniques described in this disclosure. Router 120 may be substantially similar to router 36 shown in the example of FIG. 2, except that router 120 includes a service plane 122 in addition to control plane 124A and forwarding plane 124B (which may be substantially the same as control plane 38A and forwarding plane 38B of router 36). As described above, control plane 124A may include a routing engine 126, while forwarding plane 124B includes a packet forwarding engine (PFE) 128 having one or more forwarding ASICs, not shown. The administrator may, again as described above, configure policer 60 within PFE 128.

Service plane 122 may represent a logical or physical unit separate from control plane 124A and forwarding plane 124B. Service plane 122 may include one or more logical or physical service cards, such as a service card 130. Service card 130 may execute DHCP module 44 or otherwise implement, using dedicated hardware or a combination of dedicated hardware and software, DHCP module 44. The techniques may therefore be performed in the context of a service card 130 executing DHCP module 44 for protocol-specific processing to reduce the impact of network attacks within service plane 122.

Figure 5:
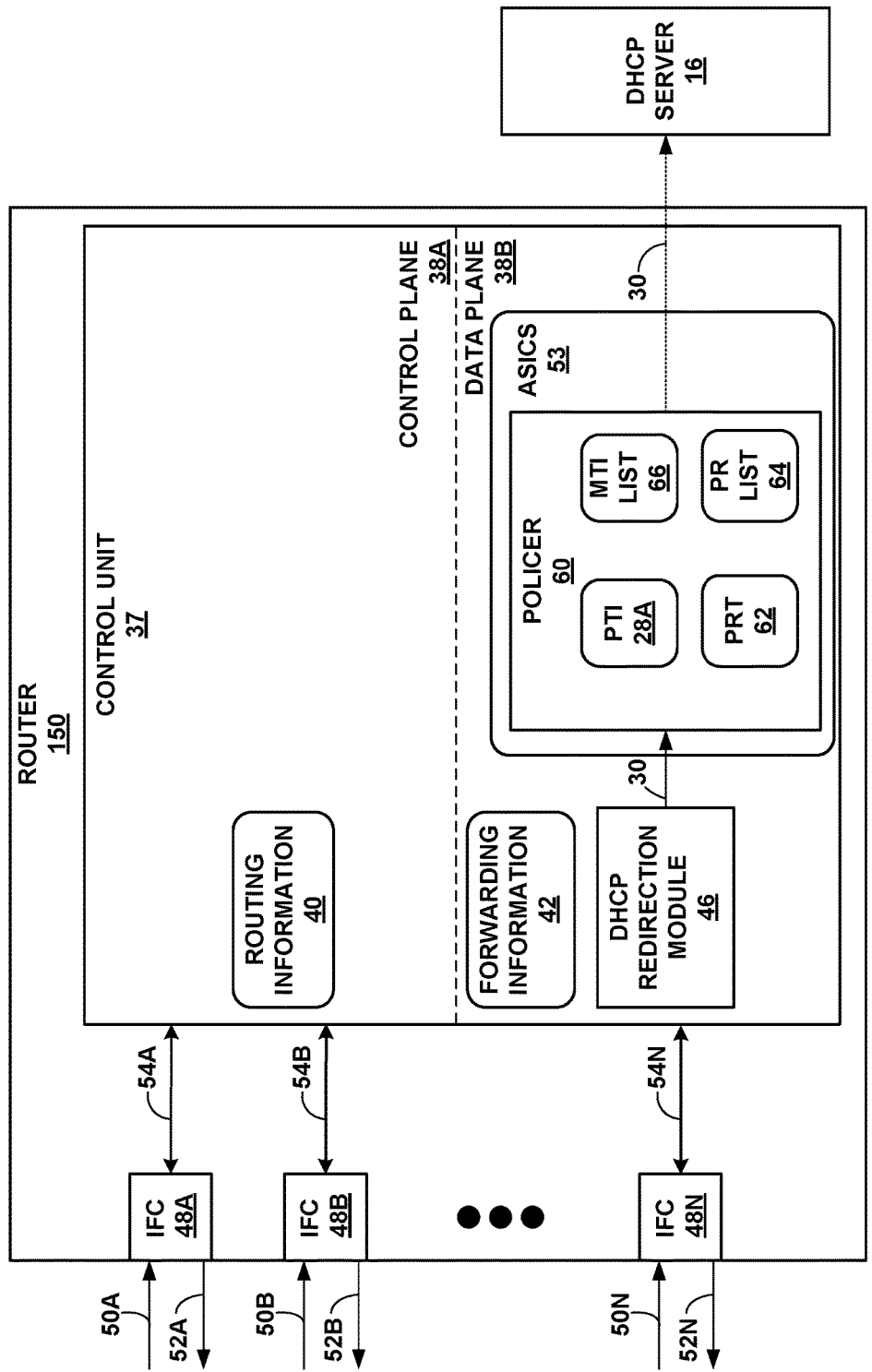
FIG. 5 is a block diagram illustrating another example of a router configured to perform various aspects of the network attack reduction techniques described in this disclosure.

FIG. 5 is a block diagram illustrating another example of a router 150 configured to perform various aspects of the network attack reduction techniques described in this disclosure. Router 150 is substantially similar to router 36 shown in the example of FIG. 2 except control plane 38A of router 150 does not include DHCP module 44 configured to operate as DHCP server 16. Instead, router 150 interfaces with a separate dedicated DHCP server 16 (which, although not shown in the example of FIG. 5, may represent a dedicated DHCP server cluster) that performs the functions attributed to DHCP module 44. Router 150 in this respect may forward DHCP packets 30 determined to not be associated with a network attack to dedicated DHCP server 16 for protocol-specific processing.

Figure 6:
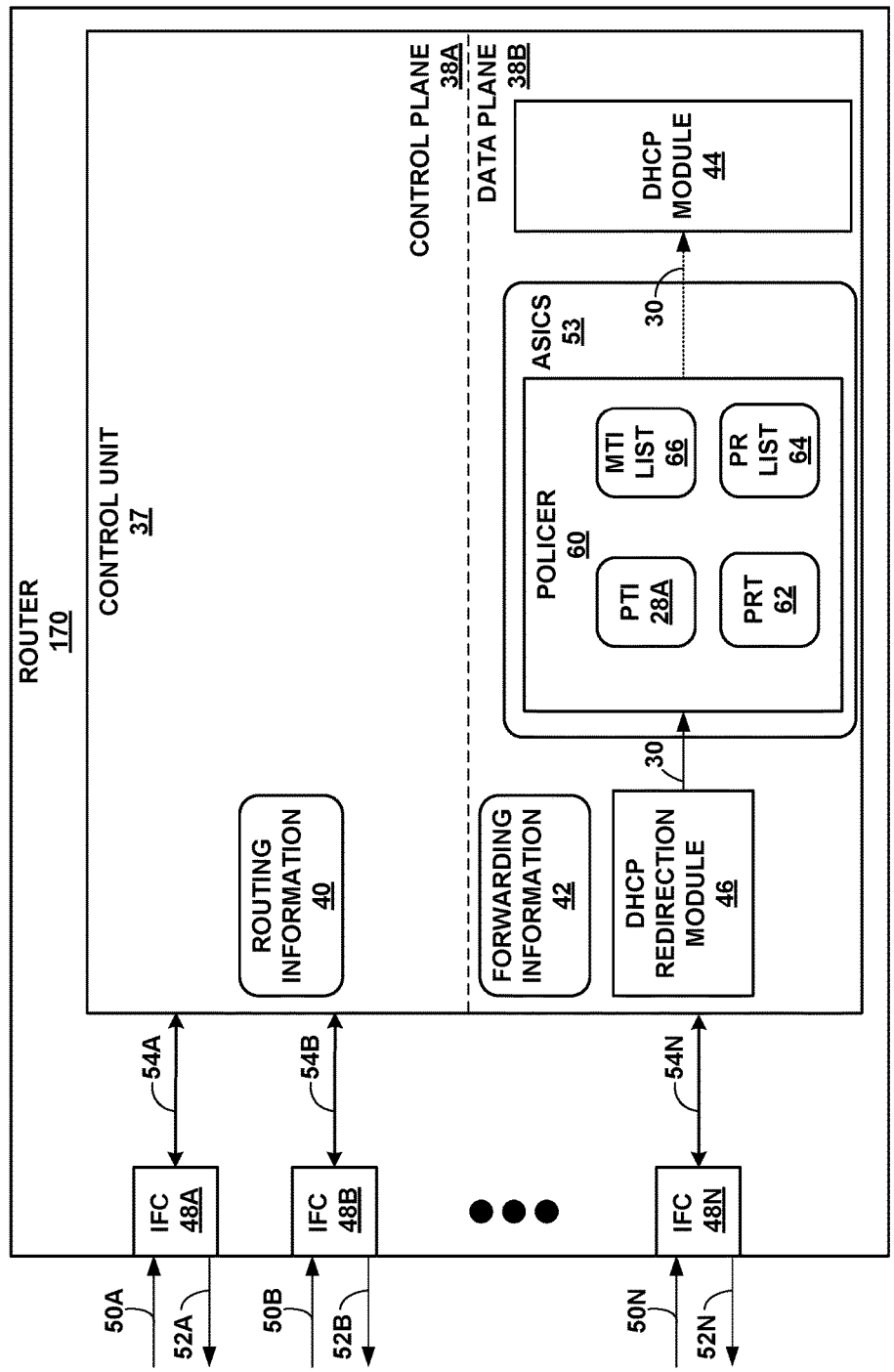
FIG. 6 is a block diagram illustrating another example of a router configured to perform various aspects of the network attack reduction techniques described in this disclosure.

FIG. 6 is a block diagram illustrating another example of a router 170 configured to perform various aspects of the network attack reduction techniques described in this disclosure. Router 170 is substantially similar to router 36 shown in the example of FIG. 2 except control plane 38A of router 150 does not include DHCP module 44 configured to operate as DHCP server 16. Instead, data plane 38B of router 170 includes DHCP module 44 configured to perform protocol-specific processing of DHCP packets 30. Router 170 in this respect may forward DHCP packets 30 determined to not be associated with a network attack to DHCP module 44 executed by or otherwise implemented in data plane 38B for protocol-specific processing.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method for defending against a network attack, the method comprising:
   receiving, by a forwarding plane of a network device, a packet from a subscriber access device positioned at an edge of a sub-network of an access network, the packet including trusted information inserted by an intermediate network device positioned between the network device and the subscriber access device, the trusted information identifying the sub-network of the access network from which the packet was received;
   determining, by the forwarding plane and based on the trusted information, whether the sub-network identified by the trusted information has been identified as participating in the network attack; and either:
   forwarding, by the forwarding plane to a control plane of the network device and responsive to the determination that the sub-network identified by the trusted information has not been identified as participating in the network attack, the packet for subsequent protocol-specific processing by the control plane; or
   dropping, by the forwarding plane and responsive to the determination that the sub-network identified by the trusted information has been identified as participating in the network attack, the packet without forwarding the packet to the control plane.

2. The method of claim 1, further comprising:
   dropping, responsive to determining that the sub-network has been identified as participating in the network attack, subsequent packets having trusted information identifying the same sub-network; and
   forwarding, to the control plane, the subsequent packets including the trusted information identifying a sub-network different from the sub-network determined to be participating to the network attack for protocol-specific processing by the control plane.

3. The method of claim 1, further comprising identifying that the sub-network is participating in the network attack when a rate of packets received from the sub-network equals or exceeds a packet rate threshold.

4. The method of claim 3,
   wherein the packet rate threshold comprises a first packet rate threshold that applies only to packets conforming to a first protocol, and
   wherein identifying that the sub-network is participating in the network attack comprises identifying that the sub-network is participating in the network attack when the rate of packets conforming to one of the first protocol or a second protocol equals or exceeds a corresponding one of the first packet rate threshold or a second packet rate threshold, the second packet rate threshold applying only to packets conforming to the second protocol.

5. The method of claim 3, wherein the packet rate threshold comprises a packet rate threshold that applies to packets conforming to two or more different protocols.

6. The method of claim 1, wherein the trusted information comprises one or more of an agent circuit identifier (ACI) or an agent remote identifier (ARI).

7. The method of claim 1, further comprising installing, by the control plane, a policer in the forwarding plane, the policer configured to determine, based on the trusted information, whether the sub-network has been identified as participating in the network attack, and either:
forward, responsive to the determination that the sub-network has been identified as participating in the network attack, the packet to the control plane for protocol-specific processing; or
drop, by the forwarding plane and responsive to the determination that the sub-network identified by the trusted information has been identified as participating in the network attack, the packet without forwarding the packet to the control plane.

8. The method of claim 1, wherein the packet includes an artificially generated media access control (MAC) address that is the same as a MAC address used by the subscriber access device or any other subscriber access device.

9. The method of claim 1, wherein the network attack comprises a Denial of Service (DoS) attack.

10. The method of claim 1, further comprising:
determining, by the control plane, routing information defining a topology of a network interconnecting the network device to the access network;
resolving, by the control plane, the topology of the network defined by the routing information to determine forwarding information including next hops identifying neighboring network devices adjacent to the network device and to which to forward network traffic;
installing, by the control plane and in hardware-based packet forwarding engines of the forwarding plane, the forwarding information;
forwarding, by the control plane and after performing the protocol-specific processing, the packet to the forwarding plane; and
forwarding, by the forwarding plane and in accordance with the forwarding information, the packet to one of the next hops.

11. A network device comprising:
a control plane having a processor executing software implementing one or more protocols;
an interface of a forwarding plane configured to receive a packet from a subscriber access device positioned at an edge of a sub-network of an access network, the packet including trusted information inserted by an intermediate network device positioned between the network device and the subscriber access device, the trusted information identifying the sub-network of the access network from which the packet was received; and
a hardware-based policer configured in a packet forwarding engine of the forwarding plane to:
determine, based on the trusted information, whether the sub-network identified by the trusted information has been identified as participating in the network attack;
forward, responsive to the determination that the sub-network identified by the trusted information has not been identified as participating in the network attack, the packet for subsequent protocol-specific processing by the control plane; and
drop, responsive to the determination that the sub-network identified by the trusted information has been identified as participating in the network attack, the packet without forwarding the packet to the control plane.

12. The network device of claim 11, wherein the hardware-based policer is further configured to:
drop, responsive to the determination that the sub-network has been identified as participating in the network attack, subsequent packets having trusted information identifying the same sub-network; and
forward the subsequent packets including the trusted information identifying a sub-network different from the sub-network determined to be participating to the network attack for protocol-specific processing by the control plane.

13. The network device of claim 11, wherein the hardware-based policer is further configured to identify that the sub-network is participating in the network attack when a rate of packets received from the sub-network equals or exceeds a packet rate threshold.

14. The network device of claim 13,
wherein the packet rate threshold comprises a first packet rate threshold that applies only to packets conforming to a first protocol,
wherein the hardware-based policer includes a second packet rate threshold that applies only to packets conforming to a second protocol, and
wherein the hardware-based policer is configured to identify that the sub-network is participating in the network attack when the rate of packets conforming to one of the first protocol or the second protocol equals or exceeds a corresponding one of the first packet rate threshold or the second packet rate threshold.

15. The network device of claim 13, wherein the packet rate threshold comprises a packet rate threshold that applies to packets conforming to two or more different protocols.

16. The network device of claim 11, wherein the trusted information comprises one or more of an agent circuit identifier (ACI) or an agent remote identifier (ARI).

17. The network device of claim 11, wherein the control plane is configured to install the hardware-based policer in the forwarding plane.

18. The network device of claim 11, wherein the packet includes an artificially generated media access control (MAC) address that is the same as a MAC address used by the subscriber access device or any other subscriber access device.

19. The network device of claim 11, wherein the network attack comprises a Denial of Service (DoS) attack.

20. A non-transitory computer-readable storage medium having stored thereon instructions that, when executed, cause one or more processors of a forwarding plane included in a network device to:
receive a packet from a subscriber access device positioned at an edge of sub-network of an access network, the packet including trusted information inserted by an intermediate network device positioned between the network device and the subscriber access device, the trusted information identifying a sub-network of the access network from which the packet was received;
determine, based on the trusted information, whether the packet is associated with a network attack;
forward, from the forwarding plane to a control plane of the network device and responsive to the determination that the sub-network identified by the trusted information has not been identified as participating in the network attack, the packet for subsequent protocol-specific processing by the control plane; and drop, responsive to the determination that the sub-network identified by the trusted information has been identified as participating in the network attack, the packet without forwarding the packet to the control plane.

* * * * *